United States Patent [19]
Fukuyama et al.

[11] Patent Number: 5,965,665
[45] Date of Patent: Oct. 12, 1999

[54] LOW GLOSS THERMOPLASTIC RESIN COMPOSITION

[75] Inventors: James M. Fukuyama; Satish Kumar Gaggar, both of Parkersburg, W. Va.

[73] Assignee: General Electric Company, Pittsfield, Mass.

[21] Appl. No.: 08/907,394

[22] Filed: Aug. 7, 1997

[51] Int. Cl.$^6$ .............................. C08L 69/00; C08L 63/00; C08L 25/12; C08L 23/00
[52] U.S. Cl. .................................. 525/65; 525/67; 525/69; 525/86; 525/109; 525/113
[58] Field of Search ................ 525/65, 67, 109, 525/113, 86, 69

[56] References Cited

U.S. PATENT DOCUMENTS

| | | | |
|---|---|---|---|
| 3,382,255 | 5/1968 | White | 549/512 |
| 5,177,277 | 1/1993 | Eryman et al. | 585/255 |
| 5,336,701 | 8/1994 | Wildi et al. | 523/411 |
| 5,530,062 | 6/1996 | Bradtke et al. | 525/65 |
| 5,580,924 | 12/1996 | Wildi et al. | 525/65 |

OTHER PUBLICATIONS

Modifying ABS Resins with Polybutene—Plastics Engineering/Nov. 1996.

*Primary Examiner*—Mark L. Warzel

[57] ABSTRACT

A low gloss thermoplastic resin composition containing a rubber modified thermoplastic resin, a gel polymer and a low molecular weight polyolefin polymer provides low surface gloss properties and improved impact properties.

17 Claims, No Drawings

LOW GLOSS THERMOPLASTIC RESIN COMPOSITION

TECHNICAL FIELD

The present invention is directed to a thermoplastic resin composition, more particularly to a thermoplastic resin composition suitable for making molded articles that exhibit low surface gloss and high impact resistance.

BACKGROUND

The use of polybutene polymers as modifiers to improve the impact properties of general purpose acrylonitrile-butadiene-styrene ("ABS") resins has been reported, see, for example, Plastics Engineering, November 1996,pp. 35–36.

ABS resins that impart low surface gloss are known, see, for example, U.S. Pat. No. 5,530,062.

An ABS composition that imparts low surface gloss properties and that provides improved impact properties is desired.

SUMMARY OF THE INVENTION

The present invention is directed to a low gloss thermoplastic resin composition that comprises a mixture of:

(a) a rubber modified thermoplastic resin comprising a discontinuous elastomeric phase and a rigid thermoplastic phase, wherein at least a portion of the rigid thermoplastic phase is grafted to the elastomeric phase; and (b) a gel polymer, in an amount effective to provide low gloss properties to the composition, (c) a low molecular weight polyolefin polymer, in an amount effective to provide improved impact properties to the composition and to enhance the low gloss properties of the composition.

The composition of the present invention is suitable for use as a molding compound for making thermoplastic articles that exhibit improved impact performance and improved low surface gloss properties, compared to articles made from analogous compositions that include a rubber modified thermoplastic resin and gel copolymer, but that lack the low molecular weight polyolefin polymer of the composition of the present invention.

In a second aspect, the present invention is directed to a thermoplastic article molded from the thermoplastic resin composition of the present invention.

The molded article of the present invention exhibits improved impact performance and improved low surface gloss properties, compared to an analogous article comprising a rubber modified thermoplastic resin and gel copolymer, but lacking the low molecular weight polyolefin polymer component of the article of the present invention.

In a third aspect, the present invention is directed to a method for making a low gloss thermoplastic resin composition, that comprises forming a substantially homogeneous mixture of:

(a) a rubber modified thermoplastic resin comprising a discontinuous elastomeric phase and a rigid thermoplastic phase, wherein at least a portion of the rigid thermoplastic phase is grafted to the elastomeric phase; and (b) a gel polymer, in an amount effective to provide low gloss properties to the composition and (c) a low molecular weight polyolefin polymer, in an amount effective to provide improved impact properties to the composition and to enhance the low gloss properties of the composition.

In a preferred embodiment, the present invention is directed to a low gloss thermoplastic resin composition that comprises, based on 100 parts by weight of the resin composition, a mixture of:

(a) from 70 to 99 parts by weight of a rubber modified thermoplastic resin, said resin comprising from 5 to 50 parts by weight of a discontinuous elastomeric phase, said elastomeric phase comprising a polymer having structural units derived from one or more conjugated diene monomers, and from 50 to 95 parts by weight of a rigid thermoplastic phase, said rigid thermoplastic phase comprising a polymer having structural units derived from one or more monomers selected from vinyl aromatic monomers and monoethylenically unsaturated nitrile monomers, wherein at least a portion of the rigid thermoplastic phase is grafted to the elastomeric phase; and (b) from 0.5 to 10 parts by weight of a gel polymer, said gel polymer being made by mixing a nitrile-containing polymer with a carrier polymer selected from the group consisting of one or more polycarbonate polymers and polystyrene polymers and reactively extruding the nitrile-containing polymer and said carrier polymer in the presence of a polyepoxide crosslinking agent and an acid catalyst selected from organic acids, mineral acids, Lewis acids and mixtures thereof, and (c) from 0.5 to 20 parts by weight of a low molecular weight polyolefin polymer, said low molecular weight polyolefin polymer comprising structural units derived from one or more $C_3$-$Cl_6$ monoolefin monomers and having a number average molecular weight range of from about 100 to about 5,000 grams per mole.

DETAILED DESCRIPTION OF THE INVENTION

In a preferred embodiment, the low gloss thermoplastic resin composition of the present invention comprises, based on 100 parts by weight ("pbw") of the resin composition, a mixture of from 70 to 99 pbw, more preferably 77 to 97 pbw and still more preferably from 84 to 94 pbw, of the rubber modified thermoplastic resin, from 0.5 to 10 pbw, more preferably from 1 to 8 pbw and still more preferably from 2 to 6 pbw, of the gel polymer and from 0.5 to 20 pbw, more preferably from 2 to 15 pbw and still more preferably from 4 to 10 pbw, of the low molecular weight polyolefin polymer.

(a) Rubber Modified Thermoplastic Resin

In a preferred embodiment, the rubber modified thermoplastic resin comprises, based on 100 pbw of the rubber modified thermoplastic resin, from 5 to 50 pbw, more preferably 5 to 35 pbw, still more preferably 10 to 25 pbw, of the elastomeric phase and from 50 to 95 pbw more preferably 65 to 95 pbw, still more preferably 75 to 90 pbw, of the rigid thermoplastic phase.

In a preferred embodiment, discrete regions of the elastomeric phase are dispersed in a substantially continuous rigid thermoplastic phase. In a more highly preferred embodiment, discrete particles of the elastomeric phase are dispersed in a continuous rigid thermoplastic phase.

(i) Elastomeric Phase

Suitable materials for use as the elastomeric phase are polymers those having a glass transition temperature ("$T_g$") of less than or equal to 25° C., more preferably less than or equal to 0° C., and even more preferably less than or equal to −30° C. As referred to herein, the $T_g$ of a polymer is the $T_g$ value of polymer as measured by differential scanning calorimetry (heating rate 20° C./minute, $T_g$ value determined at inflection point).

In a preferred embodiment, the elastomer phase comprises a polymer having structural units derived from one or more ethylenically unsaturated monomers selected from conjugated diene monomers, non-conjugated diene monomers, ($C_1$–$C_{12}$) alkyl (meth)acrylate monomers, vinyl aromatic monomers and monoethylenically unsaturated nitrile monomers. As used herein the term "ethylenically unsaturated" means having one or more sites of ethylenic unsaturation per molecule.

Suitable conjugated diene monomers include, for example, 1,3-butadiene, isoprene, 1,3-heptadiene, methyl-1,3-pentadiene, 2,3-dimethylbutadiene, 2-ethyl-1,3-pentadiene, 1,3-hexadiene, 2,4,hexadiene, dichlorobutadiene, bromobutadiene and dibromobutadiene as well as mixtures of conjugated diene monomers. In a preferred embodiment, the conjugated diene monomer is 1,3-butadiene.

Suitable non-conjugated diene monomers include, for example, ethylidene norbornene, dicyclopentadiene, hexadiene or phenyl norbornene.

As used herein, the term "($C_2$–$C_8$)olefin monomers" means a compound having from 2 to 8 carbon atoms per molecule and having a single site of ethylenic unsaturation per molecule. Suitable ($C_2$–$C_8$)olefin monomers include, for example, ethylene, propene, 1-butene, 1-pentene, heptene.

Suitable vinyl aromatic monomers include, for example, styrene and substituted styrenes having one or more alkyl, alkoxyl, hydroxyl or halo substituent group attached to the aromatic ring, including, for example, α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, for example, vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, for example, acrylonitrile, methacrylonitrile, α-chloro acrylonitrile, fumaronitrile.

As used herein, the term "($C_1$–$C_{12}$)alkyl" means a straight or branched alkyl substituent group having from 1 to 12 carbon atoms per group and includes, for example, methyl, ethyl, n-butyl, sec-butyl, t-butyl, n-propyl, isopropyl, pentyl, hexyl, heptyl, octyl, nonyl, decyl, undecyl and dodecyl, and the terminology "(meth)acrylate monomers" refers collectively to acrylate monomers and methacrylate monomers. Suitable ($C_1$–$C_{12}$)alkyl(meth)acrylate monomers include ($C_1$–$C_{12}$)alkyl acrylate monomers, for example, ethyl acrylate, butyl acrylate, iso-pentyl acrylate, n-hexyl acrylate, 2-ethyl hexyl acrylate, and their ($C_1$–$C_{12}$)alkyl methacrylate analogs such as, for example, methyl methacrylate, ethyl methacrylate, propyl methacrylate, iso-propyl methacrylate, butyl methacrylate, hexyl methacrylate, decyl methacrylate.

The elastomeric phase may, optionally, include a minor amount, for example, up to 5 percent by weight ("wt %"), of structural units derived from a polyethylenically unsaturated "crosslinking" monomer, for example, butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The elastomeric phase may, particularly in those embodiments wherein the elastomeric phase has structural units derived from alkyl (meth)acrylate monomers, include a minor amount, for example, up to 5 wt %, of structural units derived from a polyethylenically unsaturated "graftlinking" monomer. Suitable graftlinking monomers include those monomers having a first site of ethylenic unsaturation with a reactivity similar to that of the monoethylenically unsaturated monomers from which the respective substrate or superstrate is derived and a second site of ethylenic unsaturation with a relative reactivity that is substantially different from those of the ethylenically unsaturated monomers from which the elastomeric phase is derived so that the first site reacts during synthesis of the elastomeric phase and the second site is available for later reaction under different reaction conditions, for example, during synthesis of the rigid thermoplastic phase. Suitable graftlinking monomers include, for example, allyl methacrylate, diallyl maleate, triallyl cyanurate.

In a preferred embodiment, the elastomeric phase comprises from 60 to 100 wt % structural units derived from one or more conjugated diene monomers and from 0 to 40 wt % structural units derived from one or more monomers selected from vinyl aromatic monomers and monoethylenically unsaturated nitrile monomers, such as, for example, styrene-butadiene copolymers, acrylonitrile-butadiene copolymers, acrylonitrile-butadiene-styrene copolymers.

In an alternative preferred embodiment, the elastomeric phase comprises structural units derived from one or more ($C_1$–$C_{12}$)alkyl acrylate monomers. In a more highly preferred embodiment, the rubbery polymeric substrate comprises from 40 to 95 wt % structural units derived from one or more ($C_1$–$C_{12}$)alkyl acrylate monomers, more preferably from one or more monomers selected from ethyl acrylate, butyl acrylate and n-hexyl acrylate.

In a preferred embodiment, the elastomeric phase is made by aqueous emulsion polymerization in the presence of a free radical initiator, for example, an azonitrile initiator, an organic peroxide initiator, a persulfate initiator or a redox initiator system, and, optionally, in the presence of a chain transfer agent, for example, an alkyl mercaptan and coagulated to form particles of elastomeric phase material. In a preferred embodiment, the emulsion polymerized particles of elastomeric phase material have a weight average particle size of 50 to 800 nanometers ("nm"), more preferably, of from 100 to 500 nm, as measured by light transmission. The size of emulsion polymerized elastomeric particles may optionally be increased by mechanical, colloidal or chemical agglomeration of the emulsion polymerized particles, according to known techniques.

(ii) Rigid Thermoplastic Phase

The rigid thermoplastic resin phase comprises one or more thermoplastic polymers and exhibits a $T_g$ of greater than 25° C., preferably greater than or equal to 90° C. and even more preferably greater than or equal to 100° C.

In a preferred embodiment, the rigid thermoplastic phase comprises a polymer or a mixture of two or more polymers each having structural units derived from one or more monomers selected from the group consisting of ($C_1$–$C_{12}$) alkyl (meth)acrylate monomers, vinyl aromatic monomers and monoethylenically unsaturated nitrile monomers. Suitable ($C_1$–$C_{12}$)alkyl (meth)acrylate monomers, vinyl aromatic monomers and monoethylenically unsaturated nitrile monomers are set forth above in the description of the elastomeric phase.

In a highly preferred embodiment, rigid thermoplastic phase comprises one or more vinyl aromatic polymers.

Suitable vinyl aromatic polymers comprise at least 50 wt % structural units derived from one or more vinyl aromatic monomers.

In a preferred embodiment, the rigid thermoplastic resin phase comprises a vinyl aromatic polymer having first structural units derived from one or more vinyl aromatic monomers and having second structural units derived from one or more monoethylenically unsaturated nitrile monomers.

The rigid thermoplastic phase is made according to known processes, for example, mass polymerization, emulsion polymerization, suspension polymerization or combinations thereof, wherein at least a portion of the rigid thermoplastic phase is chemically bonded, i.e., "grafted", to the elastomeric phase via reaction with unsaturated sites present in the elastomeric phase. The unsaturated sites in the elastomeric phase are provided, for example, by residual unsaturated sites in structural units derived from a conjugated diene or by residual unsaturated sites in structural units derived from a graftlinking monomer.

In a preferred embodiment, at least a portion of the rigid thermoplastic phase is made by an aqueous emulsion or aqueous suspension polymerization reaction in the presence of elastomeric phase and a polymerization initiator system, for example, a thermal or redox initiator system.

In an alternative preferred embodiment, at least a portion of the thermoplastic phase is made by a mass polymerization process, wherein particles of the material from which the elastomeric phase is to be formed are dissolved in a mixture of the monomers from which the rigid thermoplastic phase is to be formed and the monomers of the mixture are then polymerized to form the rubber modified thermoplastic resin.

The amount of grafting that takes place between the rigid thermoplastic phase and the elastomeric phase varies with the relative amount and composition of the elastomeric phase. In a preferred embodiment, from 10 to 90 wt %, preferably from 25 to 60 wt %, of the rigid thermoplastic phase is chemically grafted to the elastomeric phase and from 10 to 90 wt %, preferably from 40 to 75 wt % of the rigid thermoplastic phase remains "free", i.e., non-grafted.

The rigid thermoplastic phase of the rubber modified thermoplastic resin may be formed solely by polymerization carried out in the presence of the elastomeric phase or by addition of one or more separately polymerized rigid thermoplastic polymers to a rigid thermoplastic polymer that has been polymerized in the presence of the elastomeric phase.

In a preferred embodiment, the nongrafted portion of the rigid thermoplastic phase exhibits a weight average molecular weight in the range of 10,000 to 150,000 grams per mole, as determined by gel permeation chromatography relative to polystyrene.

In a preferred embodiment, the rubber modified thermoplastic resin comprises an elastomeric phase comprising a polymer having structural units derived from one or more conjugated diene monomers, and, optionally, further comprising structural units derived from one or more vinyl aromatic monomers, and the rigid thermoplastic phase comprises a polymer having structural units derived from one or more monomers selected from vinyl aromatic monomers and monoethylenically unsaturated nitrile monomers.

In a preferred embodiment, the elastomeric phase is a polybutadiene homopolymer or a styrene-butadiene copolymer.

In a preferred embodiment, the rigid thermoplastic resin phase is a polymer or mixture of polymers comprising from 5 to 90 wt % structural units derived from α-methyl styrene, from 5 to 70 wt % structural units derived from styrene and from 5 to 50 wt % structural units derived from acrylonitrile.

In a highly preferred embodiment, the rigid thermoplastic resin phase comprises a mixture of from 20 to 95 wt %, more preferably from 30 to 80 wt %, of a first rigid thermoplastic polymer comprising from 50 to 90 wt % structural units derived from α-methyl styrene, from 10 to 50 wt % structural units derived from acrylonitrile and from 0 to 20 wt % structural units derived from styrene and from 5 to 80 wt %, more preferably from 20 to 70 wt %, of a second rigid thermoplastic polymer comprising from 60 to 85 wt % structural units derived from styrene and from 15 to 40 wt % structural units derived from acrylonitrile.

In a preferred embodiment, the composition of the present invention exhibits a heat deflection temperature of greater than or equal to 165° F., more preferably greater than or equal to 175° F., still more preferably greater than or equal to 180° F.

Each of the polymers of the elastomeric phase and of the rigid thermoplastic resin phase of the rubber modified thermoplastic resin may, provided that the $T_g$ limitation for the respective phase is satisfied, optionally include a minor amount, more preferably up to about 20 wt %, of structural units derived from one or more other copolymerizable monomers such as, for example, monoethylenically unsaturated carboxylic acids such as, for example, acrylic acid, methacrylic acid, itaconic acid, hydroxy($C_1$–$C_{12}$)alkyl (meth)acrylate monomers such as, for example, hydroxyethyl methacrylate; ($C_4$–$C_{12}$)cycloalkyl (meth)acrylate monomers such as for example, cyclohexyl methacrylate; (meth)acrylamide monomers such as for example, acrylamide and methacrylamide; maleimide monomers such as, for example, maleimides such as, for example, N-alkyl maleimides and N-aryl maleimides, maleic anhydride, vinyl esters such as, for example, vinyl acetate and vinyl propionate. As used herein, the term "($C_4$–$C_{12}$)cycloalkyl" means a cyclic alkyl substituent group having from 4 to 12 carbon atoms per group and the term "(meth)acrylamide" refers collectively to acrylamides and methacrylamides.

(b) Gel Polymer

The gel copolymer of the composition of the present invention comprises the crosslinked reaction product of a reactive polymer and a multifunctional crosslinking agent. The gel copolymer may further comprise non-crosslinked reactive polymer as well as other polymers.

Suitable reactive polymers are those having one or more substituent groups, such as, for example, nitrile groups, carboxylic acid groups, anhydride groups, epoxy groups, amino groups, per molecule that are capable of undergoing reaction with the crosslinking agent to provide a crosslinked gel copolymer.

In a preferred embodiment, the reactive polymer comprises first structural units derived from a least one monoethylenically unsaturated nitrile monomer, preferably acrylonitrile, and further comprises second structural units derived from one or more ethylenically unsaturated comonomers that are copolymerizable with acrylonitrile. Suitable monoethylenically unsaturated nitrile monomers and ethylenically unsaturated monomers are disclosed above. Suitable acrylonitrile copolymers include, for example, styrene-acrylonitrile copolymers, α-methylstyrene-acrylonitrile copolymers, acrylonitrile-styrene-(meth)acrylate graft copolymers, acrylonitrile-ethyl acrylate-styrene copolymers, acrylonitrile-butadiene-styrene graft copolymers, acrylonitrile-butyl acrylate graft copolymers and acrylonitrile-non conjugated diene rubber-styrene graft copolymers.

In a preferred embodiment, the reactive polymer comprises from 5 to 40 wt %, preferably 15 to 35 wt %, structural units derived from a monoethylenically unsaturated nitrile monomer.

In a highly preferred embodiment, the reactive polymer comprises a styrene-acrylonitrile copolymer which comprises from 60 to 90 wt % structural units derived from styrene and from 10 to 40 wt % structural units derived from acrylonitrile.

Suitable multifunctional crosslinking agents are compounds having two or more functional groups, for example, epoxy groups, amino groups, carboxylic acid groups, per molecule that are capable of reacting with the functional groups of the reactive polymer to form the crosslinked gel copolymer. In a preferred embodiment, the crosslinking agent is a polyepoxide.

Suitable polyepoxides include, for example, aliphatic diepoxides such as, for example, dodecatriene dioxide, dipentene dioxide, 1,2,7,8-diepoxy octane; bis(glycidyl ether) compounds such as, for example, polycondensates of epihalohydrin and diols or diacids wherein the diol/diacid may be either aliphatic or aromatic, such as adipic acid and phthallic acid, 1,4-butanediol-diglycidyl ether, bis-glycidyl ether of bisphenol A; cycloaliphatic diepoxides such as, for example, 3,4-epoxycyclohexyl-3,4-epoxycyclohexylcarboxylate, bis(3,4-epoxycyclohexylmethyl)adipate, bicycloheptadiene diepoxide; mixed aliphatic and cycloaliphatic diepoxides such as, for example, vinyl cyclobutene dioxide, vinyl cyclopentadiene dioxide, vinyl cyclohexene dioxide, butenecyclobutene dioxide, butenecyclopentene dioxide, butadienecyclobutadiene dioxide, butadienecyclopentadiene dioxide, pentadienecyclobutadiene dioxide; tri and polyepoxides such as, for example, glycidyl ethers of novalaks, tetraglycidyl ether of 1,1,2,2,-tetrakis(4-hyroxyphenyl) ethane, triglycidyl ether of 1,3,6-trihydroxybenzene, triglycidyl isocyanurate (TGIC) and epoxidized oils such as, for example, epoxidized tall oils, epoxidized linseed oils, epoxidized soy bean oils.

In a preferred embodiment, the polyepoxide is an alicyclic polyepoxide. In a highly preferred embodiment, the polyepoxide is 3,4-epoxycyclohexyl-3,4-epoxycyclohexylcarboxylate.

In preferred embodiments, the proportion of polyepoxide to reactive polymer is from 0.5 to 10 pbw, more preferably from 1 to 6 pbw, of the polyepoxide per 100 pbw reactive polymer.

The reactive polymer and crosslinking agent are melt blended under reactive conditions to form the gel copolymer, for example, in an extruder.

In a preferred embodiment wherein the crosslinking agent comprises a polyepoxide compound, the reactive polymer and polyepoxide compound agent are melt blended in the presence of an epoxide ring-opening catalyst. Suitable epoxide ring opening catalysts include, amines, imidazoles, organic acids, such as carboxylic acids and sulfonic acids, mineral acids and Lewis Acids. In a preferred embodiment, the ring-opening catalyst is zinc chloride or a sulfonic acid such as, for example, methyl sulfonic acid, p-toluene sulfonic acid and dodecylbenzene sulfonic acid, most preferably dodecylbenzene sulfonic acid.

In a preferred embodiment, the amount of ring-opening catalyst is about 50 to 2000 pbw catalyst per one million pbw reactive polymer, which may, alternatively, be expressed as 50 to 2000 parts per million ("ppm") catalyst, based on weight of reactive polymer. In a preferred embodiment, the reactive polymer polyepoxide and ring-opening catalyst are each fed into the throat of an extruder and melt blended in the extruder under reactive conditions to form the gel copolymer.

In a preferred embodiment, the melt mixing is carried out in a single screw or twin screw extruder, operated at 150° C. to 360° C., preferably 220° C. to 350° C., more preferably 220° C. to 330° C., and a residence time of 10 to 600 seconds.

Suitable gel copolymers and a method for making such gel copolymers are disclosed in U.S. Pat. No. 5,580,924, issued Dec. 3, 1996 to R. Wildi et al for "Reduced Gloss Thermoplastic Compositions and Processes For Making Thereof", the disclosure of which is hereby incorporated herein by reference.

In a preferred embodiment, the melt mixing is carried out in the presence of from 0.05 to 1 pbw water per 100 pbw reactive polymer, as disclosed in U.S. Pat. No. 5,336,701 issued Aug. 9, 1994 to R. Wildi et al for "Process Improvement For Improved Color Reduced Gloss Thermoplastic Compositions", the disclosure of which is hereby incorporated herein by reference.

In a highly preferred embodiment, the gel copolymer is made by melt mixing the reactive polymer and a crosslinking agent under reactive conditions and in the presence of an inert carrier polymer, to form a mixture of gel copolymer and inert carrier polymer. A suitable gel copolymer is disclosed in U.S. Pat. No. 5,530,062 for "Production Of Low Gloss Additives For Thermoplastic Resins" issued Jun. 25, 1996 to R. Bradkte et al, the disclosure of which is hereby incorporated herein by reference.

Suitable inert carrier polymers are those polymers that will not react with the reactive polymer or the crosslinking agent under the reactive extrusion conditions. Suitable inert carrier polymers include, for example, polycarbonate resins such as, for example, bisphenol A polycarbonate resin, polyolefin resins such as, for example, polyethylene, and vinyl aromatic resins such as, for example, polystyrene.

In a preferred embodiment, the inert carrier comprises a polystyrene resin or a polycarbonate resin.

In a highly preferred embodiment, the inert carrier polymer comprises a bisphenol A polycarbonate resin that exhibits a weight average molecular weight in the range of 10,000 to 100,000, as determined by gel permeation chromatography relative to polystyrene.

In a preferred embodiment, from 1 to 80 pbw, more preferably 30 to 70 pbw, reactive polymer are melt mixed with the crosslinking agent under reactive conditions in the presence of from 20 to 99 pbw, more preferably 30 to 70 pbw, inert carrier polymer.

The thermoplastic resin compositions of the invention preferably contain an amount of gel polymer effective to provide low gloss properties to the composition, that is, to reduce the surface gloss of articles molded from the composition and thus provide a molded article having a matte finish. The surface gloss of articles molded from the thermoplastic resin of the present invention can be measure by, for example, the method of ASTM D523.

(c) Low Molecular Weight Polyolefin Polymer

Suitable low molecular weight polyolefin polymers are those polymers and copolymers that comprise structural units derived from one or more $C_3$–$C_{16}$ monoolefin monomers and that have a number average molecular weight range of from about 100 to about 5,000 grams per mole, preferably from 200 to 3000 grams per mole, and more preferably from 200 to 2000 grams per mole. As used herein, the term "$C_n$ monoolefin monomer" means an acyclic straight or branched chain hydrocarbon compound having n carbon atoms per molecule and having one site of ethylenic unsaturation per molecule. Number average molecular weight may be determined by, for example, gel permeation chromatography using a polystyrene standard. Suitable $C_3$–$C_{16}$ monoolefin monomers include, for example, propene, 1-butene, trans-2-butene, cis-2-butene, isobutylene, 1-pentene, 4-methylpentene-1, 1-hexene, 1-octene, 1-nonene, 1-decene, 1-dodecene.

In a preferred embodiment, the low molecular weight polyolefin polymer comprises greater than or equal to 50 wt %, more preferably 80 to 100 wt %, structural units derived from one or more $C_4$ monoolefin monomers. Suitable $C_4$ monoolefin monomers include, for example, 1-butene, trans-2-butene, cis-2-butene and isobutylene.

In a first highly preferred embodiment, the low molecular weight polyolefin polymer consists of structural units derived from one or more $C_4$ monoolefin monomers.

In an alternative highly preferred embodiment, the low molecular weight polyolefin polymer consists of first structural units derived from one or more $C_4$ monoolefin monomers and second structural units derived from one or more comonomers selected from $C_2$–$C_3$ monoolefin monomers and $C_5$–$C_{16}$ monoolefin monomers. Suitable $C_2$–$C_3$ and $C_5$–$C_{16}$ monoolefin monomers include, for example, ethylene, propene, 1-pentene, 4-methylpentene, 1-hexene, 1-octene, 1-nonene, 1-decene, 1-dodecene.

Suitable polyolefin polymers may be prepared by polymerizing one or more monoolefin monomers by methods well known in the art, such as, for example, by a Friedel-Crafts reaction of a hydrocarbon feedstock in the presence of an aluminum chloride or boron trifluoride catalyst. The hydrocarbon feedstock may be a refinery fraction, a pure monoolefin, or a mixture of monoolefins. A ($C_3$–$C_{16}$) monoolefin monomer feedstock is preferred. If a pure olefin monomer is used which is gaseous under ambient conditions it is necessary either to control the reaction pressure or to dissolve the olefin monomer in a solvent medium, inert under the reaction conditions, in order to maintain the olefin monomer in the liquid phase. In the case of isobutylene, which is typical of monoolefin monomers, the feedstock used in the polymerization process may be pure isobutylene or a mixed $C_4$ hydrocarbon feedstock such as that resulting from the thermal or catalytic cracking operation. This is a liquid when under pressure and hence no diluent is needed.

In a preferred embodiment, the feedstock comprises about 5 to about 100 wt %, more preferably from 10 to 100 wt %, of isobutylene and may further comprise small amounts of other compounds, such as, for example, butanes, butenes, as well as minor amounts of polymerization byproducts without adverse effect on the low molecular weight polyolefin polymer product.

The polymerization temperature is selected based on the molecular weight desired in the product. As is well known, lower temperatures are used for higher molecular weights while higher temperatures are used to obtain lighter products. The polymerization can be carried out in the full range of temperatures generally associated with conventional butene polymerization, i.e., from about –100° C. to about 50° C.

A low molecular weight polyolefin polymer made by the above described process has at least one double bond per molecule. However, hydrogenated low molecular weight polyolefin polymers, such as those described in U.S. Pat. No. 5,177,277 are also useful in the present invention.

The low molecular weight polyolefin polymer may be post-functionalized with, for example epoxy functional groups. Epoxidized polyolefin polymers are described in U.S. Pat. No. 3,382,255 where the polyolefin polymer is dissolved in heptane or other appropriate solvent and reacted with an epoxy-functional acid, such as, for example, performic acid, peracetic acid, perbenzoic acid or perphthalic acid, to thereby add epoxide functional groups to the polyolefin polymer.

Suitable low molecular weight polyolefin polymers are available from commercial sources, such as, for example, Amoco Chemical Company and Elf Atochem North America, Inc.

The thermoplastic resin composition of the present invention contains an amount of the low molecular weight polyolefin polymer that is effective to improve the impact properties of the composition, that is, to improve the impact resistance of articles molded from the composition, and to enhance the low gloss properties of the composition, that is, to reduce the surface gloss of articles molded from the composition and thus enhance the matte finish of the molded article. Impact properties can be measured, by, for example, the method of ASTM D256.

(d) Other Additives

The thermoplastic resin composition of the present invention may optionally also contain various conventional additives, such as:

(1) antioxidants, such as, for example, organophosphites, for example, tris(nonyl-phenyl)phosphite, (2,4,6-tri-tert-butylphenyl)(2-butyl-2-ethyl-1,3-propanediol)phosphite, bis(2,4-di-t-butylphenyl)pentaerythritol diphosphite or distearyl pentaerythritol diphosphite, as well as alkylated monophenols, polyphenols, alkylated reaction products of polyphenols with dienes, such as, for example, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5-di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid;

(2) UV absorbers and light stabilizers such as, for example, (i) 2-(2'-hydroxyphenyl)-benzotriazoles, 2-Hydroxybenzophenones; (ii) esters of substituted and unsubstituted benzoic acids, (iii) acrylates, (iv) nickel compounds;

(3) metal deactivators, such as, for example, N,N'-diphenyloxalic acid diamide, 3-salicyloylamino-1,2,4-triazole;

(4) peroxide scavengers, such as, for example, ($C_{10}$–$C_{20}$) alkyl esters of β-thiodipropionic acid, mercapto benzimidazole;

(5) polyamide stabilizers;

(6) basic co-stabilizers, such as, for example, melamine, polyvinylpyrrolidone, triallyl cyanurate; urea derivatives, hydrazine derivatives; amines, polyamides, polyurethanes;

(7) sterically hindered amines such as, for example, triisopropanol amine or the reaction product of 2,4-dichloro-6-(4-morpholinyl)-1,3,5-triazine with a polymer of 1,6-diamine, N,N'-Bis(-2,2,4,6-tetramethyl-4-piperidenyl) hexane;

(8) neutralizers such as magnesium stearate, magnesium oxide, zinc oxide, zinc stearate, hydrotalcite;

(9) fillers and reinforcing agents, such as, for example, silicates, $TiO_2$, glass fibers, carbon black, graphite, calcium carbonate, talc, mica;

(9) other additives such as, for example, lubricants such as, for example, pentaerythritol tetrastearate, EBS wax, silicone fluids, plasticizers, optical brighteners, pigments, dyes, colorants, flameproofing agents; anti-static agents; blowing agents;

(10) flame retardant additives such as, for example, halogen-containing organic flame retardant compounds, organo-phosphate flame retardant compounds and borate flame retardant compounds.

The thermoplastic resin composition of the present invention is made by mixing the above-disclosed components together to produce a substantially homogeneous mixture thereof by, for example, melt mixing the components using, for example, a two-roll mill, in a Banbury-type mixer or in a single screw or twin-screw extruder, and, optionally, reducing the composition so formed to particulate form, for example, by pelletizing or grinding the composition.

The composition of the present invention can be molded into useful articles by a variety of means such as injection, extrusion, rotation, and blow molding and thermoforming.

Comparative Examples C1–C4 and Examples 1–4

The compositions of Comparative Examples C1–C4 and Examples 1–4 were made by combining the components set forth in below in the relative amounts indicated in TABLES I and II:

ABS1: emulsion polymerized acrylonitrile-butadiene-styrene ("ABS") graft copolymer comprising 50 pbw of a discontinuous elastomeric phase (15 pbw styrene/85 pbw butadiene, 300 nm average particle size) and 50 pbw of a rigid thermoplastic phase (copolymer of 75 pbw styrene and 25 pbw acrylonitrile);

ABS2: emulsion polymerized ABS graft copolymer comprising 50 pbw of a discontinuous elastomeric phase (polybutadiene, 300 nm average particle size) and 50 pbw of a rigid thermoplastic phase (copolymer of 75 pbw styrene and 25 pbw acrylonitrile);

ABS3: blend of an emulsion polymerized ABS graft copolymer and α-methyl styrene-styrene-acrylonitrile copolymer, comprising 14 pbw polybutadiene rubber (300 nm average particle size), 51 pbw α-methyl styrene, 11 pbw styrene and 24 pbw acrylonitrile;

ABS4: mass polymerized ABS graft copolymer comprising 11 pbw of a discontinuous elastomeric phase (polybutadiene, particle size of 800nm–1000 nm) and 89 pbw of a rigid thermoplastic phase (copolymer of 75 pbw styrene and 25 pbw acrylonitrile);

AMSAN: copolymer of 70 pbw α-methyl styrene and 30 pbw acrylonitrile;

SAN: copolymer of 75 pbw styrene and 25 pbw acrylonitrile;

Gel: 100 pbw of a copolymer of 75 pbw styrene and 25 pbw acrylonitrile, crosslinked with 3.5 pbw 3,4-epoxycyclohexyl-3,4-epoxycyclohexylcarboxylate (Bakelite® ERL 4221, Union Carbide Corporation) under melt extrusion conditions in the presence of 50 pbw polystyrene and 1200 ppm, based on the weight of styrene-acrylonitrile copolymer, of dodecylbenzene sulfonic acid;

Polyolefin: copolymer of isobutylene and butene having a number average molecular weight 435 (L-65, Amoco Chemical Company).

The respective compositions were made by combining the above-listed components in the relative amounts (in pbw) set forth in TABLES I and II in a Banbury-type compounder. The compositions were then ground in a grinder and each of the ground compositions were injection molded at 500° F., 0.8 inches/second injection speed into a 150° F. mold to form samples for testing.

The samples were tested according to the following methods: viscosity was measured using a capillary rheometer, notched impact Izod performance was measured according to ASTM D256, falling dart impact properties were measured using an instrumented impact apparatus (Dynatup) with a ½ inch diameter dart, heat deflection temperature was measured according to ASTM E-648-82, tensile strength was measured according to ASTM D 638 and gloss properties at 60° and 85° were measured according to ASTM D523.

Results of the testing are set forth in TABLES I and II for each of the compositions of Comparative Examples C1–C4 and Examples 1–4 as Viscosity in Poise ("P") at 500° F. and shear rates of 100 s$^{-1}$, 500 s$^{-1}$ and 1000 s$^{-1}$, Notched Izod impact strength in foot-pounds per inch ("ft-lb/in"), falling dart failure energy and total energy as well as standard deviation values, each in foot-pounds ("ft-lb"), heat deflection temperature in °F. ("HDT (°F.)"), tensile strength in pounds per square inch ("psi"), tensile elongation as % of initial length ("%"), and gloss at 60° and 85°.

TABLE I

|  | C1 | C2 | 1 | 2 |
|---|---|---|---|---|
| ABS1 | 40.0 | 40.0 | 40.0 | 40.0 |
| AMSAN | 40.0 | 40.0 | 40.0 | 40.0 |
| SAN | 20.0 | 16.0 | 16.0 | 16.0 |
| Gel | — | 4.0 | 4.0 | 4.0 |
| Polyolefin | — | — | 4.0 | 6.0 |
| Additives | 1.5 | 1.5 | 1.5 | 1.5 |
| Viscosity (500° F., Poise) | | | | |
| 100 sec$^{-1}$ | 7353 | 8295 | 8036 | 8026 |
| 500 sec$^{-1}$ | 3144 | 3431 | 3200 | 3244 |
| 1000 sec$^{-1}$ | 2073 | 2210 | 2051 | 2068 |
| Izod Impact (ft-lb/in) | 6.6 | 5.9 | 6.4 | 6.4 |
| Dart Impact (ft-lb) | | | | |
| Failure Energy | 30.5 | 17.2 | 22.6 | 25.1 |
| std. dev. | 5.8 | 8.5 | 6.5 | 5.8 |
| Total Energy | 35.1 | 24.5 | 30.1 | 28.7 |
| std. dev. | 2.0 | 5.6 | 5.1 | 3.3 |
| Tensile Strength | | | | |
| (psi) | 6290 | 6245 | 5635 | 5400 |
| Elongation (%) | 25 | 18 | 21 | 19 |
| HDT (° F.) | 183 | 185 | 182 | 179 |
| Gloss, 60° | 95 | 34 | 30 | 29 |

TABLE II

|  | C3 | C4 | 3 | 4 |
|---|---|---|---|---|
| ABS2 | 10.0 | 18.0 | 10.0 | 18.0 |
| ABS3 | 78.0 | 78.0 | 78.0 | 78.0 |
| ABS4 | 9.0 | — | 9.0 | — |
| Gel | 3.0 | 4.0 | 3.0 | 4.0 |
| Polyolefin | — | — | 4.0 | 4.0 |
| Additives | 1.3 | 1.3 | 1.05 | 1.25 |
| Viscosity (500° F., Poise) | | | | |
| 100 sec$^{-1}$ | 11391 | 12375 | 10780 | 12251 |
| 500 sec$^{-1}$ | 4175 | 4497 | 3940 | 4374 |
| 1000 sec$^{-1}$ | 2574 | 2739 | 2431 | 2655 |

TABLE II-continued

|  | C3 | C4 | 3 | 4 |
|---|---|---|---|---|
| Izod Impact (ft-lb/in) | 4.8 | 5.6 | 5.6 | 6.4 |
| Dart Impact (ft-lb) | | | | |
| Failure Energy | 7.6 | 5.0 | 7.4 | 7.2 |
| std. dev. | 3.2 | 2.6 | 2.4 | 3.7 |
| Total Energy | 12.6 | 17.5 | 14.9 | 23.8 |
| std. dev. | 5.2 | 5.8 | 7.0 | 2.6 |
| Tensile Strength | | | | |
| (psi) | 6625 | 6385 | 5935 | 5790 |
| Elongation (%) | 21 | 19 | 28 | 15 |
| HDT (° F.) | 194 | 192 | 212 | 214 |
| Gloss, 60° | 26.9 | 25.7 | 18.2 | 18.4 |
| Gloss, 85° | 61.6 | 65.1 | 47.2 | 48.1 |

The compositions of Examples 1–4 are illustrative of the present invention. The composition of Comparative Example C1 is a control that lacks the gel polymer and polyolefin components of the composition of the present invention. The composition of Comparative Example C2 is analogous to compositions of Examples 1 and 2, except that Comparative Example C2 lacks the polyolefin component of Examples 1 and 2. The composition of Comparative Example C3 is analogous to compositions of Example 3, except that Comparative Example C3 lacks the polyolefin component of Example 3. The composition of Comparative Example C4 is analogous to compositions of Example 4, except that Comparative Example C4 lacks the polyolefin component of Example 4.

Comparison of the results for Comparative Examples 1 and 2 shows that the introduction of the gel polymer reduces gloss, but compromises impact properties. The impact performance of each of the compositions of Examples 1–4 is improved relative to that of its respective analogous Comparative Example. The impact performance of compositions of Examples 1 and 2 approach that of the Comparative Example C1. Each of the compositions of Examples 1–4 exhibits a significant and desirable decrease in gloss compared to its respective analogous Comparative Example.

We claim:

1. A low gloss thermoplastic resin composition that comprises a mixture of:
   (a) a rubber modified thermoplastic resin comprising a discontinuous elastomeric phase and a rigid thermoplastic phase, wherein at least a portion of the rigid thermoplastic phase is grafted to the elastomeric phase; and
   (b) a gel polymer, in an amount effective to provide low gloss properties to the composition wherein said gel polymer comprises an inert carrier polymer selected from the group consisting of polycarbonate resin and polystyrene resin and
   (c) a low molecular weight polyolefin polymer, in an amount effective to provide improved impact properties to the composition and to enhance the low gloss properties of the composition whereby ASTM D523 gloss at 60° is below 34.

2. The composition of claim 1, wherein, the composition comprises, based on 100 parts by weight of the resin composition, a mixture of from 70 to 99 parts by weight of the rubber modified thermoplastic resin, from 0.5 to 10 parts by weight of the gel polymer and from 0.5 to 20 parts by weight of the low molecular weight polyolefin polymer.

3. The composition of claim 1, wherein the rubber modified thermoplastic resin comprises from 5 to 50 parts by weight of the elastomeric phase and from 50 to 95 parts by weight of the rigid thermoplastic phase.

4. The composition of claim 1, wherein the elastomeric phase comprises a polymer having structural units derived from one or more conjugated diene monomers and the rigid thermoplastic phase comprises one or more polymers each having structural units derived from one or more monomers selected from vinyl aromatic monomers and monoethylenically unsaturated nitrile monomers.

5. The composition of claim 4, wherein the rigid thermoplastic phase comprises a mixture of a first rigid thermoplastic polymer comprising first structural units derived from α-methyl styrene and second structural units derived acrylonitrile and a second rigid thermoplastic polymer comprising first structural units derived from styrene and second structural units derived from acrylonitrile.

6. The composition of claim 1, wherein the composition exhibits a heat deflection temperature of greater than or equal to 165° F.

7. The composition of claim 1, wherein the gel polymer of the present comprises the crosslinked reaction product of a reactive polymer and a multifunctional crosslinking agent.

8. The composition of claim 1, wherein the gel polymer is made by mixing a nitrile-containing polymer with a carrier polymer selected from the group consisting of one or more polycarbonate polymers and polystyrene polymers and reactively extruding the nitrile-containing polymer and said carrier polymer in the presence of a polyepoxide crosslinking agent and an acid catalyst selected from organic acids, mineral acids, Lewis acids and mixtures thereof.

9. The composition of claim 1, wherein the low molecular weight polyolefin polymer comprises structural units derived from one or more $C_3$–$C_{16}$ monoolefin monomers and has a number average molecular weight range of from about 100 to about 5,000 grams per mole.

10. The composition of claim 1, wherein greater than or equal to 50 percent by weight of the structural units of the low molecular weight polyolefin polymer are derived from one or more $C_4$ monoolefin monomers.

11. The composition of claim 1, wherein the low molecular weight polyolefin polymer comprises a copolymer derived from 1-butene and isobutylene.

12. The composition of claim 1, wherein the number average molecular weight of the low molecular weight polyolefin polymer is from 200 to 3000 grams per mole.

13. The composition of claim 1, wherein the composition comprises from 77 to 97 parts by weight of the rubber modified thermoplastic resin, from 1 to 8 parts by weight of the rigid gel polymer and from 2 to 15 parts by weight of the low molecular weight polyolefin polymer.

14. A thermoplastic article made from the composition of claim 1.

15. A method for making a low gloss thermoplastic resin composition, comprising forming a substantially homogeneous mixture of:
   (a) a rubber modified thermoplastic resin comprising a discontinuous elastomeric phase and a rigid thermoplastic phase, wherein at least a portion of the rigid thermoplastic phase is grafted to the elastomeric phase; and
   (b) a gel polymer, in an amount effective to provide low gloss properties to the composition wherein said gel polymer comprises an inert carrier polymer selected from the group consisting of polycarbonate resin and polystyrene resin and (c) a low molecular weight polyolefin polymer, in an amount effective to provide improved impact properties to the composition and to enhance the low gloss properties of the composition whereby ASTM D523 gloss at 60° is below 34.

16. A thermoplastic resin composition made by the method of claim 15.

17. A low gloss thermoplastic resin composition comprising, based on 100 parts by weight of the resin composition, a mixture of:

(a) from 70 to 99 parts by weight of a rubber modified thermoplastic resin, said resin comprising from 5 to 50 parts by weight of a discontinuous elastomeric phase, said elastomeric phase comprising a polymer having structural units derived from one or more conjugated diene monomers, and from 50 to 95 parts by weight of a rigid thermoplastic phase, said rigid thermoplastic phase comprising a polymer having structural units derived from one or more monomers selected from vinyl aromatic monomers and monoethylenically unsaturated nitrile monomers, wherein at least a portion of the rigid thermoplastic phase is grafted to the elastomeric phase; and (b) from 0.5 to 10 parts by weight of a gel polymer, said gel polymer being made by mixing a nitrile-containing polymer with a carrier polymer selected from the group consisting of one or more polycarbonate polymers and polystyrene polymers and reactively extruding the nitrile-containing polymer and said carrier polymer in the presence of a polyepoxide crosslinking agent and an acid catalyst selected from organic acids, mineral acids, Lewis acids and mixtures thereof, and (c) from 0.5 to 20 parts by weight of a low molecular weight polyolefin polymer, said low molecular weight polyolefin polymer comprising structural units derived from one or more $C_3$–$C_{16}$ monoolefin monomers and having a number average molecular weight range of from about 100 to about 5,000 grams per mole whereby ASTM D523 gloss at 60° is below 34.

* * * * *